Jan. 21, 1964 HANS-JÜRGEN C. H. DELFS 3,118,748
CLEANING MEANS FOR FILTER SLEEVES
Filed Aug. 15, 1960
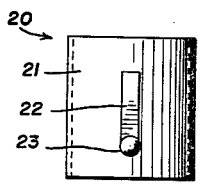
FIG. 2
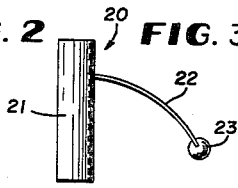
FIG. 3
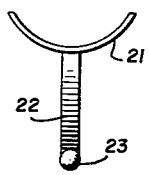
FIG. 4
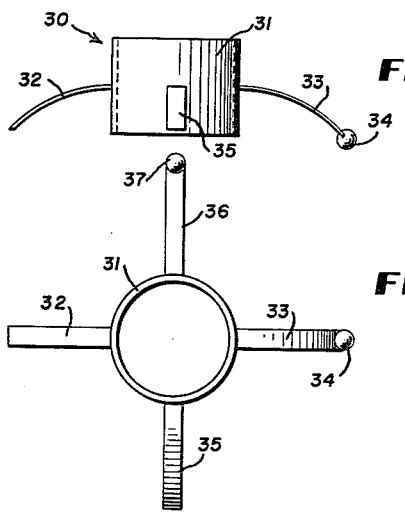
FIG. 5
FIG. 6
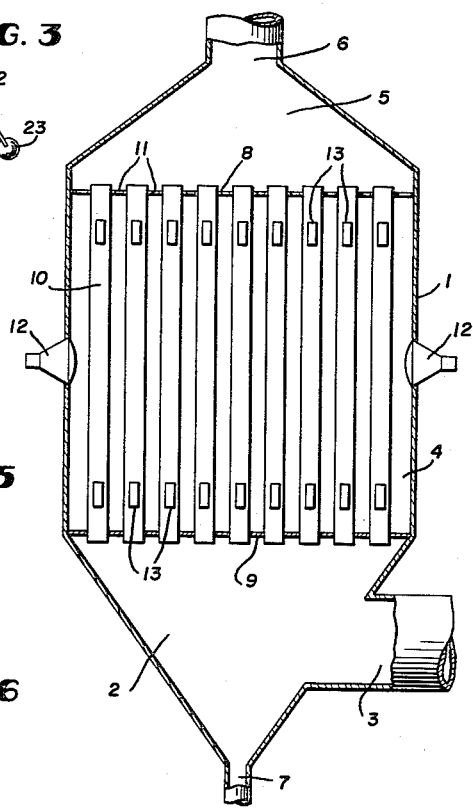
FIG. 1
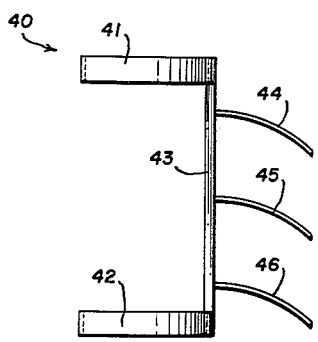
FIG. 7
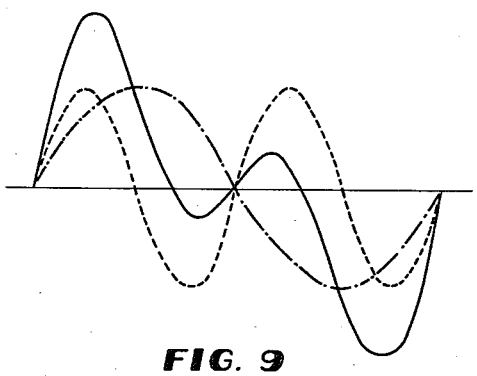
FIG. 9
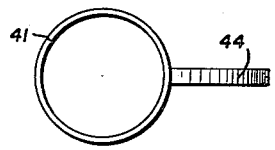
FIG. 8
INVENTOR.
HANS-JÜRGEN CLAUS HEINRICH DELFS
BY Pennie Edmonds
Morton Barrows Taylor
ATTORNEYS

United States Patent Office 3,118,748
Patented Jan. 21, 1964

3,118,748
CLEANING MEANS FOR FILTER SLEEVES
Hans-Jürgen Claus Heinrich Delfs, Hamburg-Sasel, Germany, assignor to Fuller Company, a corporation of Delaware
Filed Aug. 15, 1960, Ser. No. 49,500
Claims priority, application Germany Sept. 21, 1959
11 Claims. (Cl. 55—292)

The present invention relates to the separation of entrained or suspended particles from a flowing stream of gas wherein the gas stream is caused to pass through a filter medium which filters out the entrained or suspended particles, and particularly to a more effective manner of removing accumulated dust from the filter medium.

In one rather common form of dust collector, the dust-laden gas is passed through a housing having a series of filter media interposed in the path of flow of the gas stream from the inlet of the housing to the outlet thereof. These filter media usually are in the form of cylindrical sleeves having an open lower end and a closed upper end. They are supported at their tops and bottoms. The gas stream is caused to flow into the open lower ends of the sleeves and to pass outwardly through the side walls thereof on its way to the outlet of the housing. The entrained or suspended particles of dust or other pollutants are filtered out by the sleeves and accumulate on the inside of the sleeve walls. It is necessary periodically to remove the accumulation of solid particles from the inside of the sleeves. To this end, mechanical shakers for the sleeves have been used. More recently, it has been proposed periodically to subject the sleeves to sonic vibrations to set up in the bags the vibrations or oscillations necessary to shake the accumulated particles loose. In either case, the accumulated particles which are shaken loose drop through the lower ends of the sleeves into a lower compartment of the housing from which they are removed.

Since the filter sleeves usually are made of textile fabric, they have a low degree of elasticity and a low response to the sonic vibrations. Therefore, it has been difficult to sufficiently excite the sleeves and to set up within them adequate vibrations or oscillations to effectively shake off the accumulation of filtered particles, and thus clean the sleeves, even with a high expenditure of energy in the sonic wave generators.

In accordance with the present invention, the above disadvantages are overcome and the sonic waves are more effectively transmitted to the sleeves and the necessary vibrations or oscillations imparted to them to remove the accumulation of filtered particles, and with a less expenditure of energy. This is accomplished by attaching to each of the sleeves one or more members having a high degree of elasticity and response to the sonic vibrations. Such members will pick up and respond to the sonic waves to a far greater degree than will the filter sleeves themselves and will mechanically transmit to the filter sleeves the vibrations or oscillations which are set up in them, thereby causing a more effective shaking of the sleeves for the removal of the accumulated filtered particles.

The present invention also contemplates the use of resonance, in which case the natural or fundamental oscillation frequency of the members, which pick up the sonic waves and transmit them to the sleeves, will be the same as the natural frequency of the sonic waves generated by the sonic generator.

The invention will be further described in connection with the accompanying drawings which disclose several embodiments of the invention.

In the drawings:

FIG. 1 is a vertical sectional view of a housing having a plurality of filter sleeves with the sonic wave receivers attached to them.

FIGS. 2, 3 and 4 are, respectively, elevational, side and plan views of sonic wave receivers of a different form which may be attached to the sleeves.

FIGS. 5 and 6 are, respectively, elevational and plan views of a further embodiment of the sonic wave receivers.

FIGS. 7 and 8 are, respectively, elevational and plan views of a still further embodiment of the sonic wave receivers which may be attached to the sleeves; and FIG. 9 is an oscillation diagram with two superposed oscillations.

Referring to the drawings, and first to FIG. 1, the housing 1, which may be of conventional construction, has a lower compartment 2, into which the gas stream carrying suspended or entrained dust or other pollutants, hereinafter collectively referred to as "dust," enters through an inlet 3, an intermediate bag compartment 4 and an upper compartment 5 having an outlet 6 for discharging cleaned gases to the atmosphere. The lower compartment 2 is of generally inverted cone shape and terminates at its lower end in an outlet 7 through which dust shaken from the filter sleeves is discharged. The intermediate sleeve compartment 4 is defined by upper and lower crown sheets 8 and 9. Filter sleeves 10, having open lower ends and closed upper ends, are secured to the upper and lower crown sheets in any manner which will maintain them in a substantially taut condition. The lower crown sheet 9 is imperforate except for the openings to receive the lower ends of the sleeves so that dust-laden gas passed into the lower compartment 2 will have to pass upwardly into the sleeves through their lower ends. The upper crown sheet 8, in addition to having openings for receiving the upper ends of the sleeves, also has openings 11. Thus dust-laden gas entering the housing through the inlet 3 will pass upwardly into the sleeves through their lower ends, outwardly through the sleeve walls, which filter out the dust, into the space surrounding the sleeves, through the openings 11 in the upper crown sheet 8 and into the upper compartment 5 to be discharged through the outlet 6 to the surrounding atmosphere.

One or more sonic generators 12 are attached to the wall of the intermediate bag compartment 4 and positioned to introduce the generated waves directly into that compartment. The sonic wave generators may be such as to generate either waves in the audible or supersonic range; the term "sonic" being used herein to include both types of wave generators. The sonic generators may be a whistle, an electrically operated sound generator, or any other type of sonic generator which will generate sonic waves of the desired frequency. Such wave generators for setting up oscillations or vibrations in dust filter sleeves are now in use and well known.

Periodically, the sonic generators are set into operation to emit sonic waves to set up vibrations in the sleeves 10 to shake them sufficiently to dislodge accumulated dust from the inside of the sleeves. Since the sleeves are made of textile material, they have a low degree of elasticity, and their response to the generated sonic waves which strike them is of a corresponding low order. In order to make the sleeves more responsive to the sonic waves striking them, i.e. to oscillate and vibrate to a greater degree, each of the sleeves has attached to it, at a point where its oscillation or vibration is unrestrained, one or more sonic wave receivers 13 of metal or other material having a greater degree of elasticity and response to the sonic waves than do the sleeves themselves.

As shown in FIG. 1, one of the sonic wave receivers is attached adjacent each end of each sleeve. However, the number and arrangement of the sonic wave receivers may be varied to meet existing conditions.

The sonic wave receivers 13 preferably are arranged on the outside of the sleeves and may be permanently secured to the bags by stitching or riveting, or they may be secured to the bag in some manner which will permit them to be removed, such as prongs which will penetrate the sleeves and may be clamped against the sleeves to hold the sonic wave receivers to the bags.

The sonic wave receivers 13 of FIG. 1 are plain plates of metal curved to follow the contour of the sleeve walls. However, as will be apparent from the following discussion, the sonic wave receivers may take other forms. To obtain maximum efficiency, the sonic wave receivers 13 and those to be described are such as to have a natural oscillation frequency corresponding to the frequency of the sonic waves generated by the sonic wave generators.

The sonic wave receiver 20 of FIGS. 2, 3 and 4 includes a metal plate 21 curved to the shape of the contour of the sleeves, and a laterally-extending arm 22, preferably a thin resilient strip of metal. The outer or free end of the arm 22 may have attached to it, if desired, a weight 23. The provision of the weight 23 results in the arm having a lower natural frequency without the necessity of increasing its over-all length or mass.

The sonic wave receivers 20 may be attached to the sleeves in a manner similar to that described above with respect to the sonic wave receivers 13.

In FIGS. 5 and 6, the sonic wave receiver 30 comprises a collar or sleeve 31 of metal having an internal diameter such as to snugly fit a filter sleeve about which it is placed. It may be attached to a filter sleeve as described above. Arms 32 and 33 are attached to the sleeve or collar 31 and extend outwardly therefrom diametrically opposite one another. The arms 32 and 33 preferably are thin, resilient, metal strips. They have different natural oscillation frequencies. This may be obtained by forming them of a different mass or by securing a weight 34 to the outer or free end of one of them. In addition to the arms 32 and 33, the collar or sleeve 31 may also have arms 35 and 36 extending outwardly therefrom, diametrically opposite one another and at right angles to the arms 32 and 33. The arms 35 and 36, like the arms 32 and 33, have different natural oscillation frequencies, by making them of a different mass or by providing one of them with a weight 37, similar to the weight 34.

When the sound receivers are provided with outwardly-extending arms of different natural frequencies, like the arms 32 and 33, and 35 and 36 of FIGS. 5 and 6, a plurality of sonic generators may be used, generating waves corresponding to the natural oscillation frequencies of the respective arms. In this manner, sonic waves of new and different frequencies are set up by the superposition of the individual sonic waves, as shown in FIG. 9.

FIGS. 7 and 8 show a still further embodiment of the invention. In these figures, the sonic wave receivers 40 include a pair of spaced, metal rings 41 and 42 connected to one another by a metal strap or rod 43. The internal diameter of the rings 41 and 42 is such as to snugly fit about the outer surfaces of a filter sleeve to which the sonic receivers may be attached.

Thin, resilient, metal arms 44, 45 and 46 extend outwardly from the connecting strap or rod 43. These arms are vertically aligned, and, if desired, may, like the arms of the form of the invention shown in FIGS. 5 and 6, have different natural oscillation frequencies either by forming them of different mass or by securing a weight to the outer or free end of one or more of them.

The sonic wave receiver 40 may be permanently or removably attached to the filter sleeves in the manner set forth above with respect to the sonic wave receiver of FIGS. 2, 3 and 4.

In operation, when it is desired to dislodge the accumulation of filtered particles from the inside of tht sleeves, the sonic generator or generators 12 are set into operation to emit sonic waves. These waves are picked up by the sonic wave receivers 13 which respond thereto and vibrate or oscillate. Inasmuch as the sonic wave receivers are attached directly to portions of the sleeves which are free to oscillate in an unrestrained manner, the vibrations or oscillations set up in the sonic wave receivers are transmitted mechanically to the sleeves and the sleeves oscillate or vibrate with resultant shaking of the accumulation of dust particles from the inside of their walls. The dust particles drop through the lower open ends of the sleeves into the lower compartment 2 and discharge through the outlet 7. Since the sonic wave receivers have greater elasticity than the sleeves themselves, and respond to a greater extent to the generated sonic waves, the sleeves will be oscillated or vibrated to a greater extent than if reliance were placed entirely upon the sleeves themselves to pick up and to respond to the generated sonic waves.

When the sonic wave receivers have outwardly-extending arms which have different natural oscillation frequencies, such as the arms 32 and 33 and 35 and 36 of FIGS. 5 and 6, the sonic wave generators will be such as to generate sonic waves of different frequencies and frequencies which will correspond, respectively, to the natural frequencies of the outwardly-extending arms of the sonic wave receivers.

While it is preferred to have the sonic wave receivers attached directly to the sleeves so that the vibrations and oscillations set up in them will be mechanically transmitted directly to the sleeves, in some instances the sonic wave receivers may be suspended or arranged separate from the filter sleeves themselves. In such instances, the sound wave receivers will pick up the sonic waves and have oscillations set up in them, which in turn will be transmitted to the sleeves. Also, in the different embodiments of the invention described above, separate and independent sonic wave receivers are attached to each of the filter sleeves. It is also contemplated that one of the sonic wave receivers may be associated with one or more of the filter sleeves. In such an arrangement, the sonic wave receivers will be connected through suitable transmission means to other sleeves so that they are correspondingly shaken.

Various changes may be made in the details of construction of the sonic wave receivers described herein without departing from the invention or sacrificing any of the advantages thereof.

I claim:

1. Apparatus for removing entrained or suspended particles from a flowing gas stream comprising a filter sleeve through which the gas streeam is adapted to flow, said filter sleeve being of material having a relatively low degree of response to sonic waves, a sonic wave generator, a sonic wave receiver of material having a higher degree of response to sonic waves than the material of the filter sleeve, said sonic wave receiver including a sleeve or collar attached to and snugly fitting the outside of the filter sleeve and having at least two arms of resilient material extending laterally outwardly from said sleeve or collar, whereby vibrations or oscillations set up in the sonic wave receiver will be transmitted to said filter sleeve.

2. Apparatus as set forth in claim 1, in which said arms extend outwardly from the sleeve or collar at substantially diametrically opposite positions.

3. Apparatus as set forth in claim 2, in which said arms have different natural frequencies of vibration.

4. Apparatus as set forth in claim 3, which includes a plurality of sonic wave generators which, respectively, generate sonic waves of frequencies corresponding to the natural frequencies of vibration of said arms.

5. Apparatus as set forth in claim 4, which includes a weight at the outer or free end of one of said arms.

6. Apparatus for removing entrained or suspended particles from a flowing gas stream comprising a filter sleeve through which the gas stream is adapted to flow, said filter sleeve being of material having a relatively low degree of response to sonic waves, a sonic wave generator, and a sonic wave receiver of material having a higher degree of response to sonic waves than the material of the filter sleeve, said sonic wave receiver including a pair of spaced rings surrounding and closely embracing the filter sleeve and a member connecting said rings, whereby vibrations or oscillations set up in the sonic wave receiver will be transmitted to said filter sleeve.

7. Apparatus as set forth in claim 6, in which said rings and connecting member are metal and which includes at least one arm of resilient material extending outwardly from said connecting member.

8. Apparatus as set forth in claim 7, which includes a plurality of vertically spaced and vertically aligned arms of resilient material extending outwardly from said connecting member.

9. Apparatus for removing entrained or suspended particles from a flowing gas stream comprising a filter medium through which the gas stream is adapted to flow, said filter medium being of a material having a relatively low degree of response to sonic waves, a sonic wave generator, and a sonic wave receiver attached to said filter medium and having a higher degree of response to sonic waves than the material of the filter medium, said sonic wave receiver having a natural oscillation frequency corresponding to the frequency of the wave generated by said sonic wave generator, whereby vibrations or oscillations set up in the sonic wave receiver will be transmitted to said filter medium.

10. Apparatus for removing entrained or suspended particles from a flowing gas stream comprising a filter sleeve through which the gas stream is adapted to flow, said filter sleeve being of material having a relatively low degree of response to sonic waves and being supported at its opposite ends and maintained in a substantially taut condition longitudinally, a sonic wave generator, and a sonic wave receiver of material having a higher degree of response to sonic waves than the material of the filter sleeve, said sonic wave receiver being attached to the outside of the filter sleeve intermediate the ends of the filtering portion thereof, whereby vibrations or oscillations set up in the sonic wave receiver will be transmitted to said filter sleeve.

11. Apparatus for removing entrained or suspended particles from a flowing gas stream comprising a filter sleeve through which the gas stream is adapted to flow, said filter sleeve being of material having a relatively low degree of response to sonic waves, a sonic wave generator, and a sonic wave receiver of metal attached to the outside of the filter sleeve intermediate the ends of the filtering portion thereof, at least one arm of thin, resilient material extending outwardly from the sonic wave receiver, and a weight at the outer or free end of said arm, whereby vibrations or oscillations set up in the sonic wave receiver will be transmitted to said filter sleeve.

References Cited in the file of this patent

UNITED STATES PATENTS

| | | |
|---|---|---|
| 2,626,011 | Campbell | Jan. 20, 1953 |
| 2,768,706 | Fischer | Oct. 30, 1956 |
| 2,769,506 | Abboud | Nov. 6, 1956 |
| 2,854,091 | Roberts et al. | Sept. 30, 1958 |

OTHER REFERENCES

German Printed Application 1,004,780, Mar. 21, 1957.